US011163669B1

(12) United States Patent
Torun et al.

(10) Patent No.: US 11,163,669 B1
(45) Date of Patent: Nov. 2, 2021

(54) MEASURING TEST COVERAGE DURING PHASED DEPLOYMENTS OF SOFTWARE UPDATES

(71) Applicant: Amazon Technologies, Inc., Seattle, WA (US)

(72) Inventors: Mustafa Ugur Torun, Seattle, WA (US); Xinghuang Xu, Seattle, WA (US); Arpit Panwar, Seattle, WA (US); Yi Fang, Seattle, WA (US); Mihir Rajendrabhai Patel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/006,604

(22) Filed: Jun. 12, 2018

(51) Int. Cl.
G06F 11/36 (2006.01)
G06F 8/65 (2018.01)

(52) U.S. Cl.
CPC ............ G06F 11/3676 (2013.01); G06F 8/65 (2013.01); G06F 11/3684 (2013.01); G06F 11/3688 (2013.01); G06F 11/3692 (2013.01)

(58) Field of Classification Search
CPC ............ G06F 11/3676; G06F 11/3688; G06F 11/3684; G06F 11/3692; G06F 8/65
See application file for complete search history.

(56) References Cited

U.S. PATENT DOCUMENTS 6,847,916 B1 * 1/2005 Ying ................... G05B 23/0208
702/108
7,730,452 B1 * 6/2010 Li ........................... G06F 9/449
717/124
8,839,222 B1 * 9/2014 Brandwine ......... G06F 11/3668
717/168
10,268,574 B2 * 4/2019 Siggers ............... G06F 11/3692
10,719,427 B1 * 7/2020 Arguelles ............ G06F 11/3684
2003/0061581 A1 * 3/2003 Baumgartner ............................
G01R 31/318342
716/106

(Continued)

OTHER PUBLICATIONS

Elbaum et al., "Profiling Deployed Software: Assessing Strategies and Testing Opportunities", Apr. 2005, IEEE, vol. 31, No. 4 (Year : 2005).*

(Continued)

Primary Examiner — Wei Y Zhen
Assistant Examiner — Junchun Wu
(74) Attorney, Agent, or Firm — Nicholson De Vos Webster & Elliott LLP

(57) ABSTRACT

Techniques are described for measuring test coverage during phased deployments of software application updates. A phased deployment of a software application update generally involves initially deploying the software update to a subset of compute instances running the software application within a computing environment, using a testing application to verify whether the updated software application is operating as expected, and then deploying the update to the remaining compute instance of the computing environment once the tests are passed. A testing system and framework described herein enables a code deployment service to determine when complete or sufficient test coverage is achieved for software updates deployed in a computing environment supporting a distributed software application.

19 Claims, 9 Drawing Sheets

(56) References Cited

U.S. PATENT DOCUMENTS

| | | | | |
|---|---|---|---|---|
| 2012/0017195 | A1* | 1/2012 | Kaulgud | G06F 11/3692 717/101 |
| 2012/0079457 | A1* | 3/2012 | Makey | G06F 11/3688 717/124 |
| 2013/0036328 | A1* | 2/2013 | Mutisya | G06F 11/1433 714/15 |
| 2013/0145250 | A1* | 6/2013 | Neumueller | G06F 11/3696 715/234 |
| 2015/0039941 | A1* | 2/2015 | Kalyanasundram | G06F 11/3692 714/38.1 |
| 2015/0169431 | A1* | 6/2015 | Ivankovic | G06F 11/3676 717/124 |
| 2017/0147474 | A1* | 5/2017 | Hughes | G06F 11/3664 |
| 2017/0270032 | A1* | 9/2017 | Ballal | G06F 11/3672 |
| 2018/0293152 | A1* | 10/2018 | Sherafat Kazemzadeh | G06F 11/368 |
| 2019/0065345 | A1* | 2/2019 | Patel | G06F 11/3612 |
| 2019/0116110 | A1* | 4/2019 | Raney | H04L 43/50 |
| 2020/0057711 | A1* | 2/2020 | Patel | G06F 11/3664 |
| 2020/0125485 | A1* | 4/2020 | Wiener | G06F 11/3466 |

OTHER PUBLICATIONS

Lucas-Simarro et al., "Scheduling strategies for optimal service deployment across multiple clouds", 2012, Elsevier B.V. (Year: 2012).*

Mini et al., "Sensor Deployment and Scheduling for Target Coverage Problem in Wireless Sensor Networks", Mar. 2014, IEEE, vol. 14, No. 3 (Year: 2014).*

Bressan et al., "The Deployment of a Smart Monitoring System using Wireless Sensors and Actuators Networks", 2010, IEEE (Year : 2010).*

* cited by examiner

MEASURING TEST COVERAGE DURING PHASED DEPLOYMENTS OF SOFTWARE UPDATES

BACKGROUND

Many companies and other organizations operate computer networks that interconnect numerous computing systems to support their operations. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Figure 1:
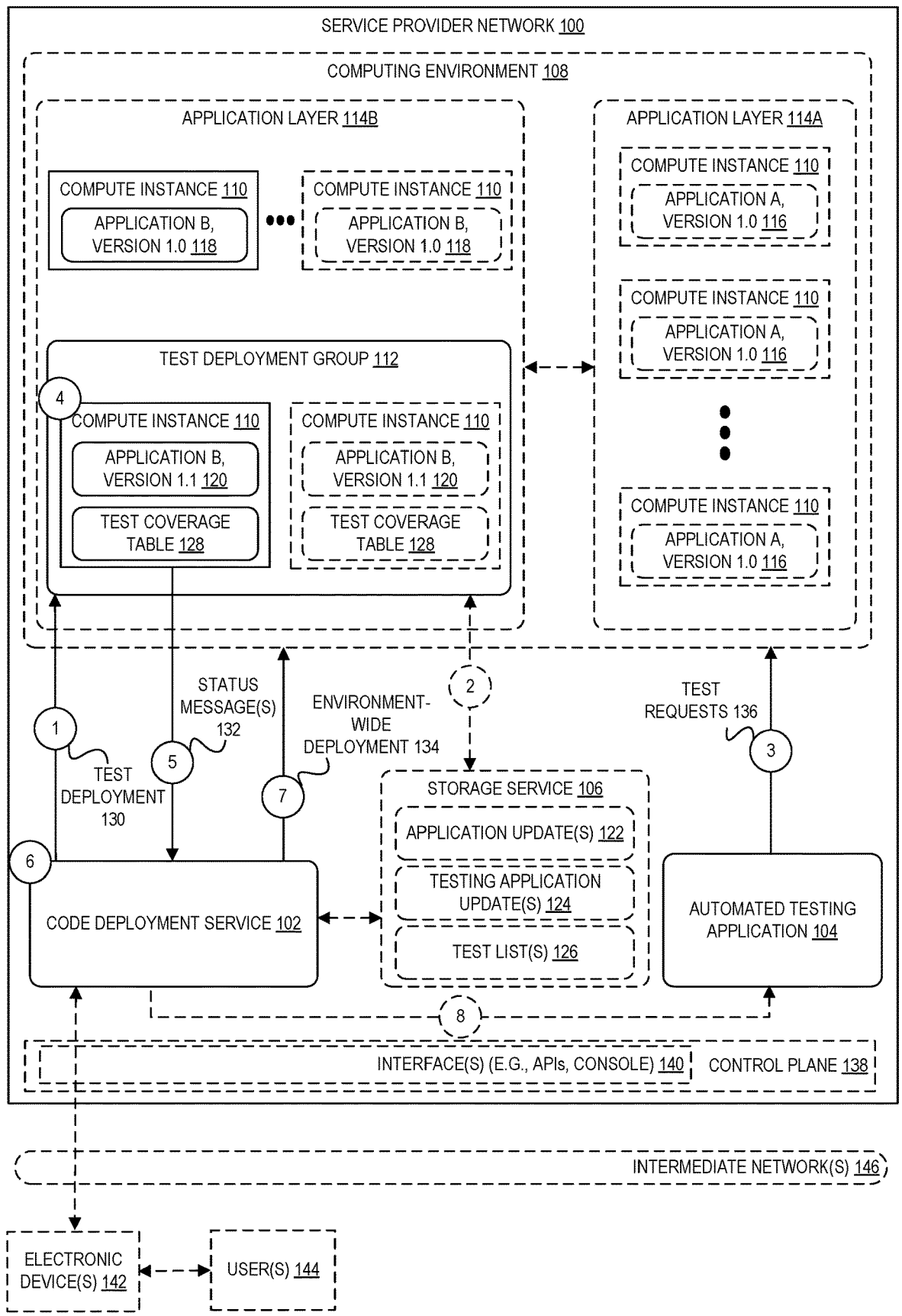
FIG. 1 is a block diagram illustrating an environment for measuring test coverage during a phased deployment of a software update according to some embodiments.

Various embodiments of methods, apparatus, systems, and non-transitory computer-readable storage media are described for measuring test coverage during phased deployments of software application updates. According to some embodiments, the phased deployment of a software application update generally involves initially deploying the software update to a subset of compute instances running the software application within a computing environment (also referred to herein as a "test deployment group"), using an automated testing application to verify whether the updated software application is operating as expected, and then deploying the update to the remaining compute instances of the computing environment once the tests are passed. This deployment strategy is sometimes called a "one-box" deployment in reference to the process of deploying and testing software updates at one test compute instance, or "box," before deploying the software update throughout the computing environment (although in practice a test deployment group can contain any fraction of the total number of compute instances in the computing environment). Among other benefits, the identification and correction of software bugs and other issues at the "one-box" phase of a deployment can help prevent the widespread deployment of such issues to an entire computing environment running a software application.

The phased software deployment process described above can be particularly useful during the development of distributed software applications which can include any number of component applications, each of which can be installed across any number of separate compute instances. Each of compute instances can be a separate physical host, a virtual machine (VM), a container, a serverless function implemented by a serverless compute service, or any other type of computing resource capable of executing an instance of the software application. An example distributed software application might include a "web tier" implemented by a first application and further include a separate, but related, "data tier" implemented by a second application, where the application software implementing each of the tiers might be deployed to tens, hundreds, or thousands of separate compute instances depending on the scale of the system. In some environments, each of the tiers or layers of the software application is designed to operate as a "microservice," such that the application as a whole is a collection of loosely coupled microservices. In this example, application requests received by the web tier, data tier, or both may be distributed across the compute instances supporting each tier. The distribution of requests across compute instances running a same software application can be used for load balancing purposes, to increase the redundancy and resiliency of the application, to achieve a level of geo-proximity to users of the application, to be part of the application data flow between application layers, among other possible uses.

Each of the separate applications or microservices supporting such distributed software applications are often under continual development and receive updates over time to add new features, to address security vulnerabilities, and to generally improve the software's performance. As described above, one process for deploying software updates to these types of distributed software applications involves deploying an update to one or a few test compute instances and performing tests to ensure that the updated software application continues to work as expected before deploying the software update to the rest of the compute instances running the same application. To manage this process, developer teams often use various types of code deployment services and tools to manage the software deployment cycle. For example, these tools typically enable software developers to coordinate deployments to defined deployment groups consisting of selected groups of compute instances, to configure processes to be performed by compute instances receiving a deployment, to run validation steps before allowing deployment to progress from one deployment group to another (for example, from a test deployment group to a deployment group containing all compute instances), among other features.

Another common aspect of software development today is the use of automated tests to test applications for software bugs, performance problems, and other issues. For example, these automated tests can mimic certain types of user interactions with an application and, more generally, can include any types of tests used to determine whether a software application is operating as intended. In some cases, these automated tests can be configured to run continuously against a computing environment to monitor the behavior of a software application over time and as updates are applied to the application. In some embodiments described herein, such automated testing is performed by an automated testing application that is separate from the software application being tested and that can be configured by developers of the software application to test relevant aspects of the software application. For example, an automated testing application may continuously or periodically generate application requests in the form of application programming interface (API) requests, command-line interface (CLI) commands, or the like, depending on the types of input accepted by the software application, where each of the requests is designed to test operation of one or more aspects of the software application.

The use of automated testing in combination with phased deployments of software updates to distributed software applications presents some challenges. For example, as indicated above, the phased deployment of a software update typically involves first deploying a software update to a test deployment group that includes a subset of the total number of compute instances running the software application to be updated. However, as also described above, the computing environments supporting such applications typically distribute application requests across the total set of compute instances running the same software application for load balancing and other reasons. Thus, when a computing environment supporting a distributed software application receives a request generated by an automated testing application, the computing environment typically routes the request to one or more of the compute instances available to process the request at each layer as the request flows through the system. Depending on the scale of the software application, the computing environment might include tens, hundreds, thousands or more compute instances at each layer available to process any given request. As a result, if a test deployment group represents only a relatively small percentage of the total number of compute instances available in a computing environment to process such requests, the likelihood of a compute instance in the test deployment group processing any given test request received by the computing environment can be rather small.

To contend with the issue above, some software development teams deploy software updates to a relatively small test deployment group of a computing environment, confirm that automated tests are running against the computing environment, and then wait an arbitrary amount of time before deploying the software update to the remaining compute instances running the software application in the computing environment. Here, the assumption is that each of the automated tests eventually will be observed by compute instances of the test deployment group given a sufficiently long period of time and a corresponding sufficient distribution of requests. However, the developers' ability to accurately determine an appropriate amount of time to wait to ensure that complete test coverage is achieved decreases as the scale of a distributed software application and number of tests to be performed grows, among other issues.

According to embodiments here, a testing system and framework is described that enables a code deployment service to determine when complete or sufficient test coverage is achieved for software updates deployed in a computing environment supporting a distributed software application. In an embodiment, a code deployment service deploys an update to a software application to one or more compute instances that are part of a test deployment group. The test deployment group includes a defined subset of a plurality of compute instances running the software application within a computing environment. In one embodiment, the one or more compute instances of the test deployment group obtain data identifying a set of tests to be observed by the compute instances to test operation of the software application. For example, the compute instances can obtain a test list from a storage service or other storage location, where the test list identifies each of the tests to be observed based on requests generated by an automated testing application.

In an embodiment, an automated testing application sends a plurality of requests to the computing environment, each of the plurality of requests corresponding to one test of the set of tests and including an identifier of the test to which the request corresponds. The computing environment routes each of the requests generated by the automated testing application to one or more compute instances of the computing environment for processing. For example, an automated testing application might generate various API requests that are sent to a frontend layer of a distributed software application, where each of the API requests includes data in a header of the request identifying a test to which it corresponds. A compute instance in the frontend layer receiving the request might then place the request in a buffer or other type of queue where it is consumed by an available compute instance in a backend layer that further processes the request, or a compute instance in the frontend layer might make a direct call to the backend layer that is processed by a compute instance in the backend layer. In an embodiment, the identifier of the test to which the request corresponds follows the request as it flows from one compute instance in the computing environment to another.

In an embodiment, compute instances that are part of a test deployment group create and maintain a table or other data structure that tracks which tests have been observed by the compute instance, referred to herein as a test coverage table. The "observation" of a test request by a compute instance indicates, for example, that the compute instance has processed or otherwise interacted with a request that the automated testing application is using to test the application. For example, an automated testing application may send test requests to the application with various forms of input and test the operation of the application by verifying that the application generates an expected output for each of the provided inputs. As requests generated by an automated testing application flow through the computing environment, compute instances of a test deployment group that receive a test request can analyze the request to identify the metadata indicating a test to which the request corresponds, check the test coverage table to determine if it is a test the compute instance is expected to but has not yet observed, process the test request, and store data in the table indicating that the compute instance observed the test. In some embodiments, the compute instances of the test deployment group monitor the test coverage table and each periodically sends status messages indicating whether the compute instance has observed all tests, where the status messages may be sent to the code deployment service, to a separate metric or logging service, or to any another system component accessible to the code deployment service.

In an embodiment, at some point in time, the code deployment service determines that each test of the set of tests has been observed by at least one compute instance of the deployment group based on the status messages generated by the compute instances of the test deployment group. In an embodiment, once the code deployment service has determined that each test of the set of tests has been observed by at least one compute instance of the deployment group, the code deployment service deploys the update to other compute instances of the plurality of compute instances running the software application. As indicated above, in some embodiments, a code deployment service can be configured to monitor status messages generated by the compute instances such that the deployment service only deploys the update to the entire computing environment when it determines that each test of the set of tests has been performed successfully. In this manner, the code deployment service can accurately progress the deployment of a software update from a test deployment phase to a broader deployment phase when full test coverage is achieved by at least one compute instance in the initial test deployment group, thereby avoiding the need to estimate when such test coverage is achieved.

Although many of the examples provided herein are described in the context of a distributed software application running on compute instances provided by a service provider network, the techniques described herein for measuring test coverage are generally applicable to deploying software updates to any software application running on two or more separate compute instances in any type of computing environment.

FIG. 1 is a block diagram illustrating an environment for measuring test coverage during a phased deployment of a software update according to some embodiments. In some embodiments, one or more of a computing environment 108, a code deployment service 102, an automated testing application 104, and a storage service 106 operate as part of a service provider network 100 and each comprise one or more software modules executed by one or more electronic devices at one or more geographic locations and data centers managed by the service provider.

A service provider network 100 allows users to use a variety of types of computing-related resources such as compute resources (for example, executing virtual machine (VM) instances, executing containers, executing batch jobs, executing code without provisioning servers), data and storage resources (for example, object storage, block-level storage, data archival storage), network-related resources (for example, configuring virtual networks including groups of compute resources, content delivery networks (CDNs), Domain Name Service (DNS)), application resources (for example, databases, application build/deployment services), and so forth. In some embodiments, these and other computing resources are provided as services, such as a hardware virtualization service that can execute compute instances, a storage virtualization service that can store data objects, and so forth. The users (or "customers") of a service provider network 100 use one or more user accounts that are associated with a customer account, though these terms can be used somewhat interchangeably depend ending upon the context of use. Users typically interact with a service provider network 100 across one or more intermediate networks 146 (for example, the internet) via one or more interface(s) 140, such as through use of application programming interface (API) calls, via a console implemented as a website or application, or the like. The interface(s) 140 may be part of, or serve as a frontend to, a control plane 138 of the provider network 100 that includes "backend" services supporting and enabling services offered to customers.

To provide these and other computing resource services, service provider networks 100 often rely upon virtualization techniques. For example, virtualization technologies can be used to provide users the ability to manage and use compute instances (for example, a VM using a guest operating system (O/S) that operates using a hypervisor that may or may not further operate on top of an underlying host O/S, a container that may or may not operate in a VM, or an instance that can execute on "bare metal" hardware without an underlying hypervisor), where one or multiple compute instances can be implemented using a single electronic device. Thus, users can directly use compute instances hosted by the provider network to perform a variety of computing tasks, or can indirectly use a compute instance by submitting code to be executed by the provider network, which in turn utilizes one or more compute instances to execute the code (typically without the user having any control of or knowledge of the underlying compute instance(s) involved).

In the example illustrated by FIG. 1, a computing environment 108 is shown supporting execution of a distributed software application system including a first application layer 114A implemented by an application A 116 running on some number of compute instances 110 and a second application layer 114B implemented by an application B 118 running on some number of other compute instances 110. The compute instances 110 are generally independent of one another and each can represent one or more of a standalone computing device, a VM (which can execute on a same physical host as other compute instances), a container, one or more serverless functions, or any other computing resource capable of executing the software application. Each of the compute instances 110 supporting one or more of the software applications running in the computing environment 108 may be created using a service of the service provider network 100 (for example, a hardware virtualization service, a container service, a serverless compute service), or managed by a user directly in a on-premises or other type of computing environment. The example distributed software application system shown in FIG. 1, for example, might represent a web application, including a frontend "web" application layer 114A implemented by the application A 116 that is configured to route some or all requests received by the frontend (for example, in the form of API or other types of Hypertext Transfer Protocol (HTTP)-based requests) to a backend, "data" layer implemented by the separate application B 118. Although the distributed software application system illustrated in FIG. 1 includes two separate application layers, a distributed software system can include only a single layer or any number of distinct layers depending on a desired system architecture. The development of software applications using separate application layers generally enables developers to create flexible and reusable software application components that may be part of a larger software-based system.

As indicated above, the development of software applications (including, for example, the application A 116 and application B 118 that compose the software system illustrated in FIG. 1) typically involves the periodic creation and deployment of software updates. For example, at the circle labeled "1," a code deployment service 102 deploys a software update to a test deployment group 112 of the computing environment 108 (shown in FIG. 1 as the test deployment 130 of application B 120, "version 1.1" relative to the "version 1.0" of application B 118). In some embodiments, a code deployment service 102 is a service, application, or other tool that automates various aspects of deploying software-based applications and updates to compute instances upon which the applications are to execute.

In an embodiment, a determination that a software update is available for deployment can be based on the code deployment service 102 receiving a request from a user 144 using electronic device(s) 142 and accessing the service via a web-based interface, a CLI, or other any type of interface. In other examples, the code deployment service 102 may determine that a software update is available for deployment based on a notification received from another internal or external service (for example, based on a notification received when code is committed to a particular repository), based on a notification from a vendor of the software application that is to be updated, from an administrator of the service provider network 100, or from any other source. In some embodiments, the code deployment service 102 is a component of or works in coordination with a more comprehensive code deployment pipeline service or application (not shown) that can be used more generally to provide continuous integration and delivery of updates to software applications.

In an embodiment, the creation of a test deployment group 112 is configured by a user involved in the development or maintenance of the application B 120 software. For example, upon receiving an indication of an available update, a user can use a web-based graphical user interface (GUI) or other interface to create the test deployment group and to assign a set of one or more compute instances to be members of the test deployment group. In other examples, the test deployment group 112 can be created automatically by the code deployment service 102 upon notification of an update to be deployed. The automatic creation of the test deployment group 112 can be based on parameters and other input provided by a user such as, for example, input specifying a number of compute instances 110 to be included in the group, input specifying a percentage of the total number of instances running the application to which the update applies, input specifying type(s) of instances to use for the test deployment group, and so forth. Although the test deployment group 112 shown in FIG. 1 includes compute instances in a single backend application layer 114B running the same application B, in general, a test deployment group 112 can span multiple application layers and can include compute instances running different software applications or application versions. In other examples, a software update deployment can involve multiple test deployment groups (for example, one test deployment group for an update to application A and another test deployment group for an update to application B) that are managed as part of a same deployment.

In an embodiment, the deployment of an update to compute instance(s) of a deployment group 112 can involve several operations, including one or more of: stopping execution of the version of the software application running on the compute instances 110 of the test deployment group 112 (for example, initially "version 1.0" of application B 118), downloading the software update to the compute instances 110 of the test deployment group 112 (for example, downloading "version 1.1" of application B 120 stored as part of application update(s) 122 at a storage service 106 or other location), creating a backup of the existing software application, installing the updated version of the software application on the compute instances, configuring the installed software application, and starting execution of the installed software application. In some embodiments, some or all of the deployment operations described above can be performed by a deployment agent installed on the compute instances 110, or by other processes installed on the compute instances or on components external to the compute instances.

In an embodiment, a software application update deployed to the test deployment group 112 includes a collection of software components and configuration information used to run the software application on the compute instances 110 of the test deployment group. An update to a software application refers to a specific version of the software and configuration information which may be different from other versions of the software application. As indicated above, for example, a software application B 118 that implements a backend of the application layer 114B might initially be installed and associated with a "version 1.0" (or other version identifier based on a different versioning scheme). Developers of the software application B 118 may update one or more parts of the software application, including the source code, configuration information, and any other associated data, resulting in a "version 1.1," shown as application B 120 installed on compute instance 110 of the test deployment group 112. The deployment of software application update can include entirely replacing the existing version of the software application, or updating only one or more components of a software application and leaving the remainder of the application as is.

In an embodiment, a software update deployed by a code deployment service 102 can involve one or more applications running at one or more separate layers, or tiers, of a software application. As indicated above, the various layers of the application can be used to separate different functions of the software application—for example, one layer might be used to implement request handling and presentation functions, while another layer might be used to implement application processing and data management functions, and so forth. An update to the software application system shown in FIG. 1, for example, might include an update to only application B 118, only to application A 116, or to both, although the update to each application may be deployed independently of one another. In some embodiments, two or more separate applications (for example, an application A 116 and application B 118) can co-exist on one or more the compute instances 110 of a computing environment 108 and updates can be deployed together or separately.

In an embodiment, once the software update is deployed to compute instances 110 in the test deployment group 112, at circle "2," the compute instances 110 in the test deployment group 112 obtain data identifying a set of tests to be observed by the compute instances 110 to test operation of the software application. In one embodiment, the data is a file that is maintained by the code deployment service 102 and is stored by the code deployment service using a separate storage service 106 or at any other storage location. In other embodiments, the data can be represented in other ways—for example, as entries in a database or other type of network-accessible data store—and can delivered to the compute instances 110 of the test deployment group 112 as part of the deployed software, in one or more separate requests to the compute instance(s), or using other delivery methods. In various embodiments, the compute instance(s) 110 of the test deployment group 112 are configured to download the test list(s) based on service code running on the instances, by a deployment agent installed on the compute instances, based on code included in the software update, based on code associated with the software update via a library or a software development kit (SDK) provided by the service provider, or based on any other code executing on the compute instances. In other examples, the code deployment service 102 includes the data indicating the tests as part of the deployment package that is sent to the compute instances, or the data is sent using a separate channel of communication with the compute instances 110.

In an embodiment, at circle "3," an automated testing application 104 is used to test the software application(s) running in the computing environment 108 (including testing the application implementing application layer 114A, application layer 114B, or both, in FIG. 1). In various embodiments, the automated testing application 104 can be one or more of: a component of the code deployment service 102, a component of a different service of the service provider network 100, a separate standalone service of the service provider network 100, a separate application that is hosted internally or externally to the service provider network 100, or an application hosted by a compute service of the service provider network 100. In one embodiment, the automated testing application is configured to continuously, periodically, or randomly test the software application(s) running in the computing environment 108 based on a set of tests configured for the environment.

In an embodiment, an automated testing application 104 can include testing and validation of both functional and non-functional aspects of the software application. For example, the tests can involve unit tests, API tests, and any other types of tests to determine whether the application meets functional, performance, security, compliance, and any other types of expectations. Often the tests may correspond to various types of input and actions performed by users of the software application and may be specific to the types of actions that can be performed by a particular application (for example, one application may accept input only via API requests, while another application provides various GUI interfaces that can receive input, and so forth). In some embodiments, the application tests initiated by the automated testing application 104 can be created and configured as part of the development process of the application being tested. For example, each time a significant feature is added to the software, a developer may create a corresponding test to ensure that the feature operates as expected (for example, by validating that the feature generates acceptable outputs in response to various inputs, validating that execution of the feature completes in an acceptable amount of time, and so forth).

In one embodiment, the test requests 136 generated by the automated testing application 104 include metadata used to identify one or more tests of the set of tests to which the request corresponds, among other possible information. The metadata can be included with the test requests 136 in different ways depending on a format of the request. For example, if the automated testing application 104 generates HTTP-based API requests to test operation of the application B 120, the automated testing application 104 can include an identifier of the test (for example, a name of the test such as "test-A" or "test-B") to which each request corresponds in the header of the request, as a field of the payload, as any other part of the request, or as a separate request sent in conjunction with the test request 136. As another example, if the automated testing application 104 generates CLI commands to test the application, the automated testing application 104 can include the metadata as a parameter of the generated CLI commands. The metadata included with the requests can be passed along by compute instances within the application as the request flows through the system, for example, as a test request 136 is passed from a frontend compute instance 110 initially receiving the request at application layer 114A to a backend compute instance 110 that further processes the request at application layer 114B.

Figure 2:
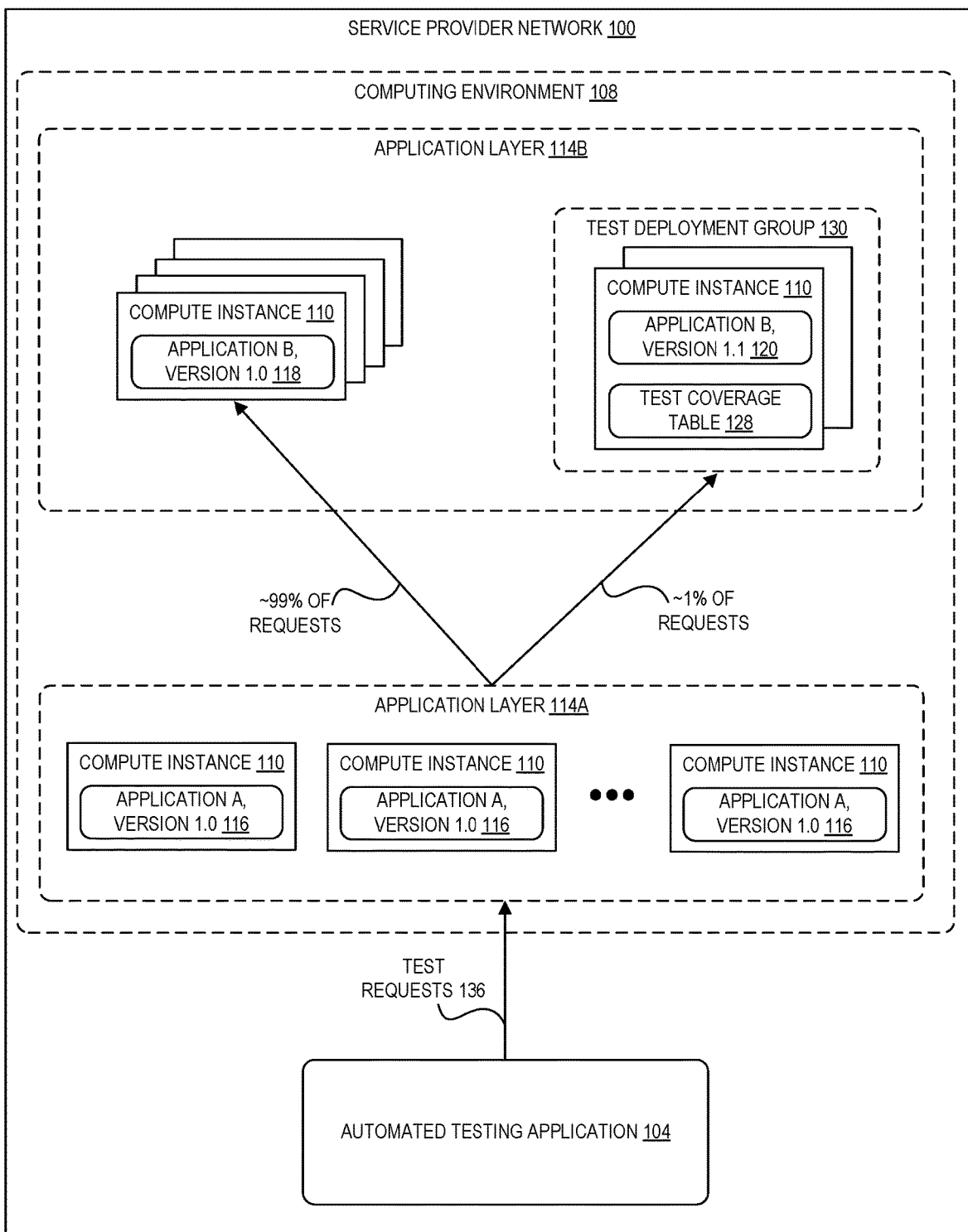
FIG. 2 is a block diagram illustrating a computing environment routing requests received from an automated testing application according to some embodiments.

FIG. 2 is a block diagram illustrating a computing environment routing requests received from an automated testing application. As shown in FIG. 2, an automated testing application 104 generates test requests 136, where some or all of the requests include metadata identifying a test to which the request corresponds. In the example of FIG. 2, a compute instance 110 of a frontend application layer 114A receives and distributes requests to one of the compute instances 110 in the backend application layer 114B. For example, a compute instance 110 of the frontend application layer 114A may add the received requests to a buffer used as a request queue that is consumed by compute instances in the backend application layer 114B, or the compute instances 110 of the frontend application layer 114A can call compute instances in the backend application layer 114B directly. In an embodiment, the frontend application layer 114A passes an unmodified copy of requests to the backend application layer 114B, or the frontend application layer 114A may modify requests in some way but retain the metadata identifying a test to which the request corresponds. As shown in FIG. 2, assuming an approximately equal distribution of requests from the frontend application layer 114A to compute instances of the backend application layer 114B, and further assuming that only 1% of the compute instances supporting the backend application layer 114B have received the updated software application B 120 identified as "version 1.1," then approximately 99% of the test requests are consumed by a compute instance 110 outside of the test deployment group 112, while the remaining 1% are consumed by a compute instance 110 that is part of the test deployment group 112.

As illustrated above in FIG. 2 and described elsewhere herein, requests sent to a computing environment supporting a distributed software application are often received by a frontend layer which passes the requests to one or more backend hosts for further processing. For some distributed software applications and service provider networks 100, the service provider network maintains a relationship between certain groups of frontend and backend compute instances and allows requests to only pass between compute instances in the same group. For example, the grouping of compute instances in this manner may be used to isolate particular customers from one another, isolate requests originating from particular geographies, or to isolate other types of requests from one another for security, performance, or other reasons. For this reason, in some embodiments, a frontend layer such as application layer 114A may be configured to identify requests generated by an automated testing application 104 and to distribute these requests to any compute instance in other application layers (including those that cross instance groups) to better ensure that compute instances within a test deployment group are able to eventually receive such requests.

Referring again to FIG. 1, in one embodiment, at circle "4," each of the compute instances 110 in the test deployment group 112 creates and maintains a test coverage table 128 or other similar data structure that identifies each of the tests to be observed by the compute instance and an indication of whether each test has been observed. For example, the application B 120 or other software running on the compute instances 110 in the test deployment group 112 can create the table in memory based on the test list(s) 126 obtained at circle "3."

In an embodiment, each time a request is received by a compute instance 110 in the test deployment group 112 from the automated testing application 104 (either directly or via another compute instance 110 in the computing environment 108), the compute instance analyzes the request to determine whether the request is a test request and, if so, to identify a test to which the request corresponds based on a test identifier included with the request. The compute instance 110 can then update an entry in the test coverage table 128 indicating that the test request has been observed by the compute instance. For example, if a compute instance in the test deployment group 112 receives a test request 136 indicating that it corresponds to a test named "test-A" (which request may trigger the application B 120 running on the compute instance to execute particular functionality to be tested by the automated testing application 104), the compute instance can process the request and, assuming no validation or other errors are identified, update the test coverage table 128 to indicate that the test request was observed. The compute instance running application B 120 can continue to update the test coverage table 128 in this manner during the lifespan of the application or, if the test coverage table 128 is persisted in other storage, across multiple independent executions of the application. For example, if the application B 120 is a serverless application that is invoked each time a request is received, the application may store the test coverage table 128 at a remote storage location that can be accessed across separate invocations of the serverless application.

Figure 3:
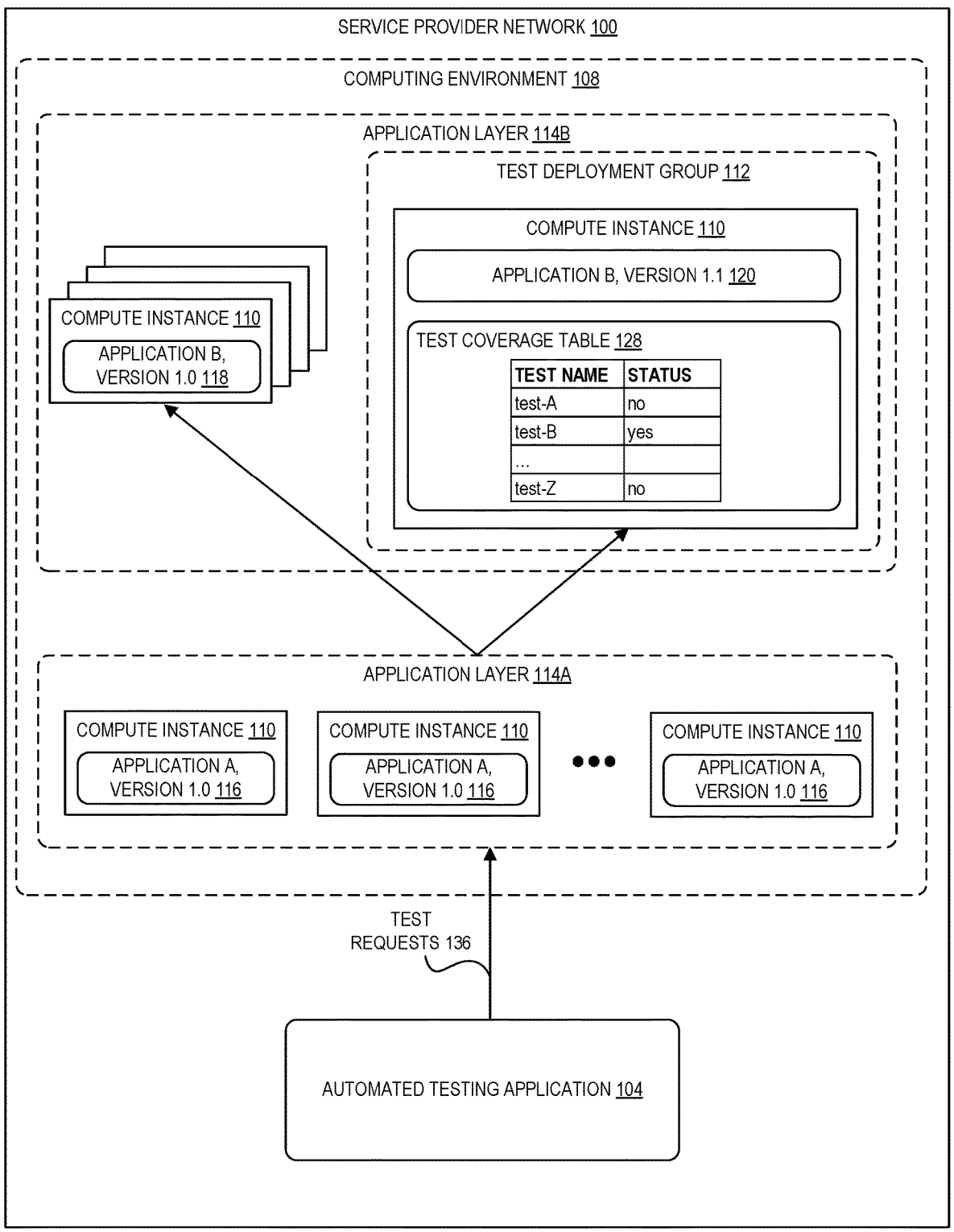
FIG. 3 is a block diagram illustrating an example test coverage table maintained by a compute instance of a test deployment group according to some embodiments.

FIG. 3 is a block diagram of an example test coverage table 128 maintained by a compute instance of a test deployment group 112 to which an update to a software application has been deployed. As indicated above, a compute instance can create a test coverage table 128 based on one or more test list(s) 126 obtained by the compute instance and indicating various tests to be observed by the compute instance. In an embodiment, a test coverage table 128 includes a separate entry for each test to be observed, where each entry includes a field storing an identifier of a respective test and a field storing an indication of whether the test has been observed by the instance (for example, the "status" field of the test coverage table 128 shown in FIG. 3 stores the value "yes" if the test has been observed or "no" if the test has not been observed). In other embodiments, a compute instance can include other fields in the test coverage table such as a field indicating a time at which each test request was received, an amount of time taken to process each test request, a number of times each test request is received, and so forth. As described below, a compute instance 110 can generate test coverage status messages in part by analyzing a test coverage table 128 and determining whether a status field associated with each test to be observed by the compute instance indicates that the test has been observed.

In an embodiment, at circle "5," the compute instances 110 in the test deployment group 112 periodically send one or more test coverage status messages 132 or other signals indicating a test coverage status, where the status generally provides information indicating whether the compute instance has observed all of the tests identified in the test coverage table 128. For example, the application B 120 or other software running on the compute instances of the deployment group 112 may be configured to periodically send test coverage status messages 132 to the code deployment service 102, to a separate logging or metric service (not shown in FIG. 1), or to any other system component. In one embodiment, the information includes only a binary indication of whether the compute instance has observed all of the tests of the set of tests identified in the test coverage table 128 (for example, a "true" or "false" indication). In other embodiments, the information can include an indication of how many of the tests have been observed, a percentage of the tests that have been observed, identifiers of particular tests that have been observed, identifiers of particular tests not yet observed, among other possible types of test coverage information. In various embodiments, a compute instance sends a status message 132 each time it observes a test, on a continuous, periodic, or scheduled basis, at random intervals, upon observation of all tests or a certain percentage of tests, or at any other time(s).

In an embodiment, at circle "6," the code deployment service 102 determines that each test of the set of tests (or a percentage of the tests deemed sufficient) has been observed by at least one compute instance 110 in the test deployment group 112. In one embodiment, the code deployment service 102 determines that the application B 120 deployed to the compute instances 110 of the test deployment group 112 has observed all tests based on the test coverage status message(s) generated the application at circle "5". As described above, for example, the code deployment service 102 may receive the status message directly from the compute instances or by obtaining the status message(s) from a logging service or other component to which the compute instances send the status message(s) 132. In other embodiments, the code deployment service 102 determines that the test coverage is complete by sending a request to one or more of the compute instances in the test deployment group 112, or by analyzing a test coverage table 128 that is stored at a location separate from the compute instances of the test deployment group 112.

In an embodiment, at circle "7," in response to determining that the test coverage is complete and thus that the software update is operating as expected, the code deployment service 102 deploys the update to the software application (that is, "version 1.1" of the application B 120) to the remaining compute instances 110 of the computing environment 108 running the same software application. For example, once the code deployment service 102 determines that at least one compute instance 110 of the test deployment group 112 has observed all the tests of the tests list(s) 126, the code deployment service 102 can deploy the software out to the rest of the compute instances 110 still running the older application B 118, "version 1.0" in the application layer 114B. In other embodiments, the code deployment service 102 waits until each compute instance 110 of the test deployment group 112 sends a status message 132 indicating that all tests have been observed, or waits until all tests of the test list(s) 126 have been observed by the compute instances 110 of the test deployment group 112 collectively, even if no single compute instance has observed all tests.

Similar to the deployment of the software update to the test deployment group 112, the environment-wide deployment 134 of the software update can involve one or more of: stopping execution of the version of the software application running on the compute instances, downloading the software update to the compute instances, creating a backup of the existing software application, installing the updated version of the software application on the compute instances, configuring the installed software application, starting execution of the installed software application, and so forth. In an embodiment, if the code deployment service 102 instead receives an indication that one or more of the compute instances 110 of the test deployment group 112 has failed one or more tests, the code deployment service 102 performs a rollback of the software installed on the compute instances in the test deployment group for further diagnosis of the issue (that is, the service returns the compute instances and the software to a state before the update was installed).

In an embodiment, at circle "8," the code deployment service 102 optionally updates the testing application and the test list(s) 126 if any tests have been added to test features of the updated software application. For example, assume that the application B 118, "version 1.0," is associated with a set of N sets identified in a test list 126. In this example, a developer creates an update to the software application to add various features or to correct bugs and creates five additional tests to test the updated parts of the application, resulting in a total of N+5 tests. In some embodiments, when the software update is deployed to a test deployment group 112, the automated testing application does not yet use the five new tests, which are likely to fail since the older version(s) of the software application do not have the new parts of the application being tested. Thus, the set of tests used by the automated testing application 104 may not be updated when an update is deployed to a deployment group 112. Instead, the software update is deployed to the test deployment group and the test list 126 is not updated with the new tests (that is, the list identifies only the original N tests).

In the example above, once the original N tests are confirmed to complete successfully, the update to the software application can then be deployed to the remaining compute instances of the computing environment and the code deployment service 102 can update the automated testing application 104 and test list(s) 126, as shown at circle "8." In some embodiments, the code deployment service 102 can update the automated testing application 104 in a manner similar to the deployment of other types of updates, for example, a testing application update 124 can be obtained from a storage location, deployed to one or more compute instances upon which the automated testing application 104 executes, and the updated version of the testing application can be started. In this case, the updated automated testing application now tests the application(s) running in the computing environment 108 with the N+5 tests. In some embodiments, when an updated automated testing application 104 is deployed, the automated testing application discovers the names of the tests to be performed in the update and updates the test list(s) 126 at the storage service 106. In other embodiments, the test list(s) 126 can be updated by the code deployment service 102 or any other process. In this manner, the next time a software update is deployed to a test deployment group 112 of the computing environment 108, the compute instances of the test deployment group obtain the test list(s) 126 now containing N+5 tests and the testing process proceeds as described above in reference to circles "3"-"7."

Figure 4:
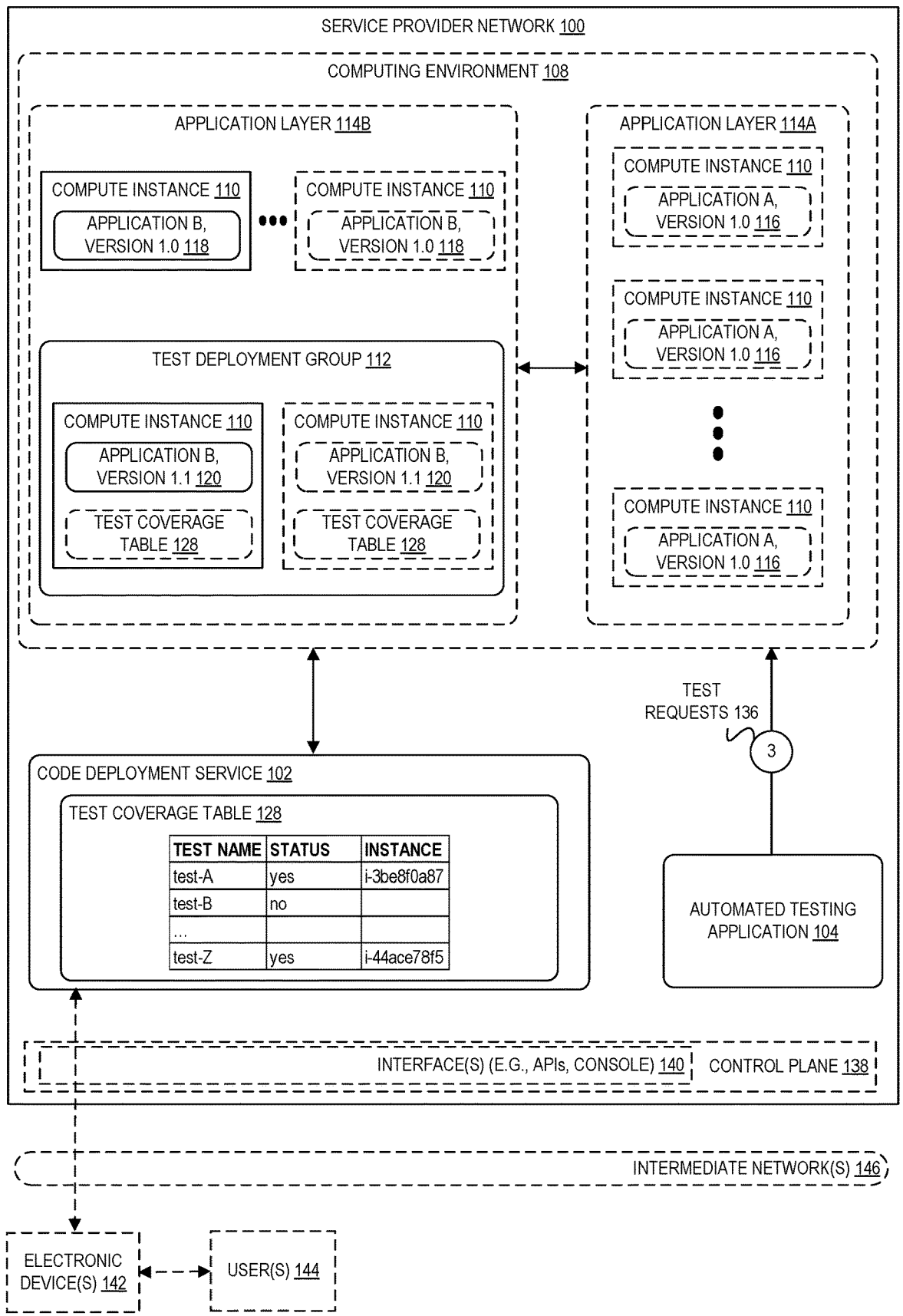
FIG. 4 is a block diagram illustrating a code deployment service measuring test coverage for a test deployment group according to some embodiments.

FIG. 4 is a block diagram illustrating a code deployment service centrally measuring test coverage for a test deployment group according to some embodiments. As described above in relation to FIGS. 1 and 3, in some embodiments, each compute instance 110 of a test deployment group 112 maintains a test coverage table 128 indicating which tests of a set of tests have been observed by the application running on the compute instance. In other embodiments, the measurement of test coverage may be performed alternatively or additionally by other components of a service provider network 100, including the code deployment service 102. For example, in FIG. 4, a code deployment service 102 maintains a centralized test coverage table 128 similar to the test coverage table 128 maintained by the compute instances 110 in FIG. 1. In this example, the code deployment service 102 can maintain the table based on status messages received from the compute instances 110 indicating tests observed by the compute instances. In this manner, the code deployment service 102 can readily determine when the compute instances of a test deployment group collectively have observed all desired tests, even if no one compute instance has observed all of the tests individually. For example, if a test list 126 includes tests "test-A," "test-B," "test-C," "test-D," and "test-E," one of the compute instances in the test deployment group may send status messages indicating observance of "test-A," "test-C," and "test-D," while another compute instance sends messages indicating observance of "test-B" and "test-E", thereby indicating that at least one compute instance has observed each test of the set of tests. In an embodiment, a code deployment service 102 creates and maintains a test coverage table 128 in a manner similar to that described above, for example, by obtaining a test list from a storage service or other storage location and creating entries for each test identified in the list.

Figure 5:
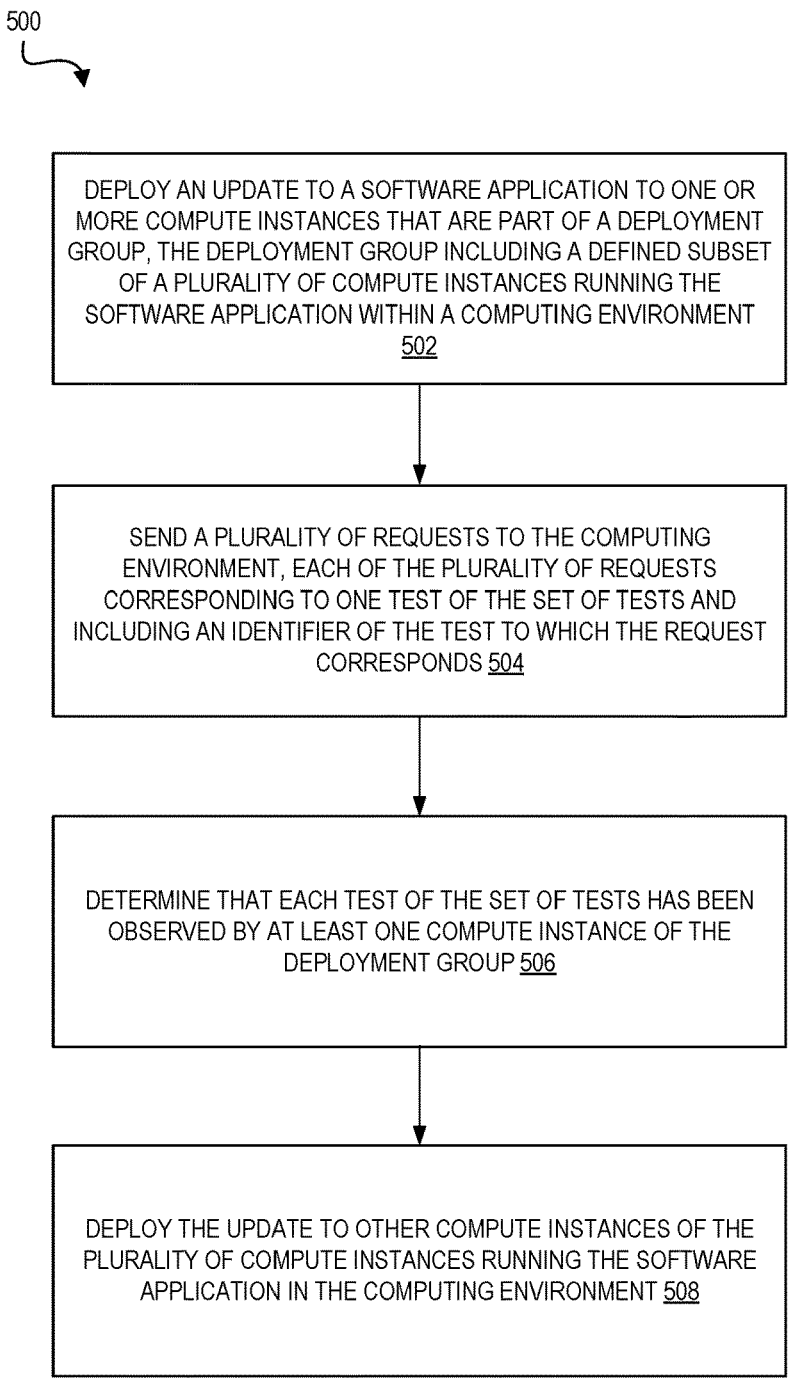
FIG. 5 is a flow diagram illustrating an example process for measuring test coverage during a phased deployment of a software update according to some embodiments.

FIG. 5 is a flow diagram illustrating operations 500 for measuring test coverage during a phased software according to some embodiments. Some or all of the operations 500 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by a code deployment service 102, an automated testing application 104, compute instances 110, and possibly other components of the other figures.

The operations 500 include, at block 502, deploying an update to a software application to one or more compute instances that are part of a deployment group, wherein the deployment group includes a defined subset of a plurality of compute instances running the software application within a computing environment. In reference to FIG. 1, for example, a code deployment service 102 or other tool can be used to deploy an update (for example, "version 1.1" of application B 120) to a software application (for example, "version 1.0" of application B 118) to the compute instances 110 that are part of the defined test deployment group 112. As shown in FIG. 1, the compute instances 110 of the test deployment group 112 are a subset of the total set of compute instances 110 running the software application B in the computing environment 108.

The operations 500 further include, at block 504, sending a plurality of requests to the computing environment, each of the plurality of requests corresponding to one test of the set of tests and including an identifier of the test to which the request corresponds. For example, the automated testing application 104 shown in FIG. 1 is configured to send a plurality of test requests 136 to the computing environment 108 to test the operation of application A 116, application B 118, the updated application B 120, or any combination thereof. The test requests 136 may be received by one or more of the compute instances 110 of the test deployment group 112 directly from the automated testing application 104 or indirectly via other compute instances 110 of the computing environment (for example, via a frontend application layer 114A). For example, requests received by a compute instance 110 of the computing environment 108 may be configured to route the requests to other compute instances of the environment for further processing.

The operations 500 further include, at block 506, determining that each test of the set of tests has been observed by at least one compute instance of the deployment group. In one embodiment, determining that each test of the set of tests has been observed is based on obtaining an indication generated by at least one compute instance of the deployment group indicating that the at least one compute instance has observed all tests of the set of tests. For example, a code deployment service 102 can obtain the indication based on one or more status message(s) 132 received directly from compute instances of the test deployment group 112, by analyzing status message(s) 132 sent to a separate service or storage location, or by receiving the indication from a separate service or storage location receiving the status message(s) 132.

The operations 500 further include, at block 508, deploying the update to other compute instances of the plurality of compute instances running the software application. For example, once the code deployment service 102 has determined that each test of the set of tests identified in the test list(s) 126 has been observed by at least one compute instance of the test deployment group 112, the code deployment service 102 can deploy the update to the other compute instances 110 running the same software application (for example, the other compute instances 110 of the application layer 114B also running the application B 118).

Figure 6:
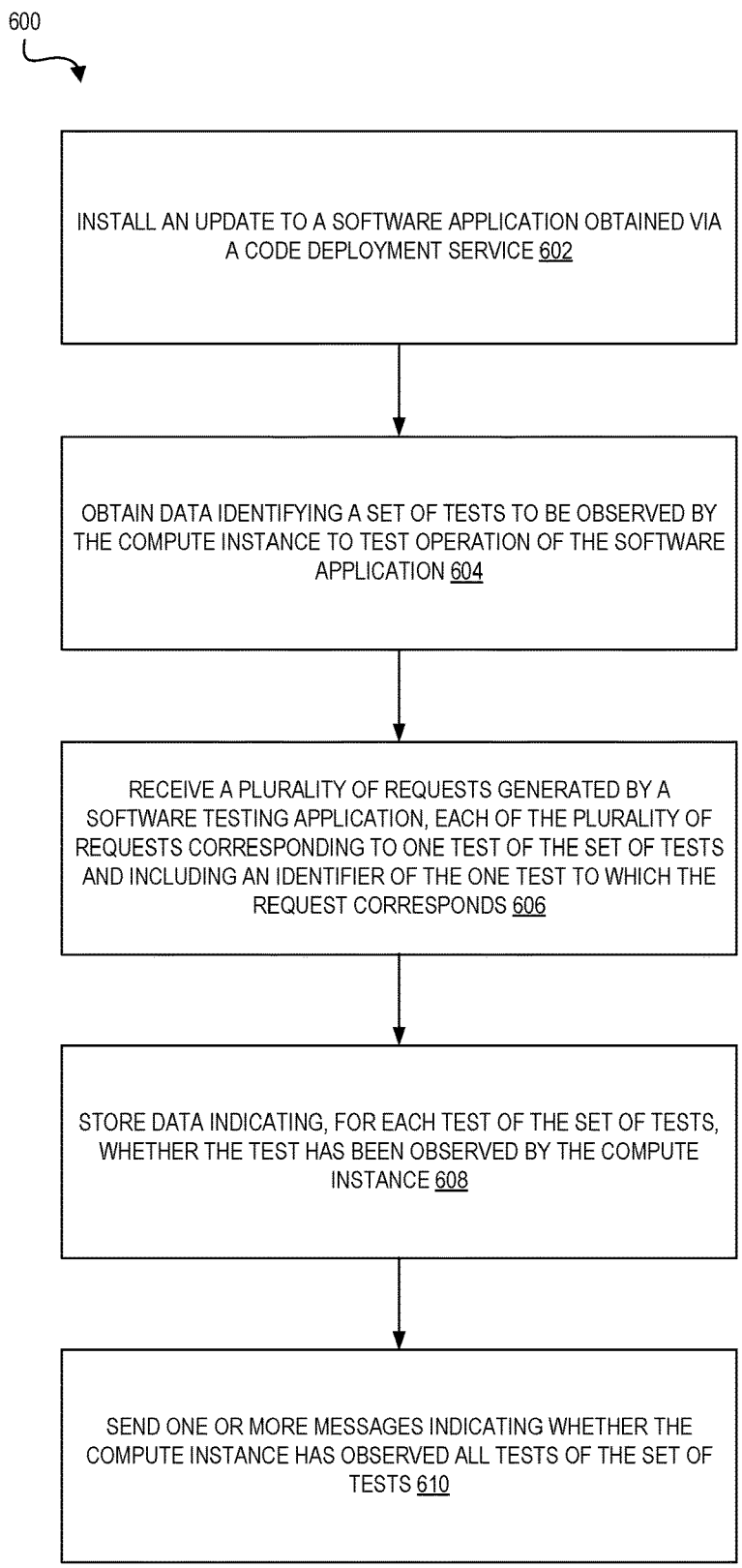
FIG. 6 is a flow diagram illustrating an example process performed by a compute instance that is part of a test deployment group during a phased deployment of a software update according to some embodiments.

FIG. 6 is a flow diagram illustrating operations 600 for an example process performed by a compute instance that is part of a test deployment group during a phased deployment of a software update according to some embodiments. Some or all of the operations 600 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by a compute instance 110 of a computing environment 108 the other figures.

The operations 600 include, at block 602, installing an update to a software application obtained via a code deployment service. Referring to FIG. 1, for example, a compute instance of a test deployment group 112 installs an update to "version 1.0" of application B 118 obtained from the code deployment service 102 (or obtained from another storage location at the direction of the code deployment service).

The operations 600 further include, at block 604, obtaining data identifying a set of tests to be observed by the compute instance to test operation of the software application. For example, the compute instances 110 obtain test list(s) 126 from a storage service 106 or other storage location, where the test list(s) include identifiers of tests to be observed by the compute instances to test operation of the application.

The operations 600 further include, at block 606, receiving a plurality of requests generated by a software testing application, each of the plurality of requests corresponding to one test of the set of tests and including an identifier of the one test to which the request corresponds. For example, an automated testing application 104 generates a plurality of test requests 136, each request corresponding to a test from the test list(s) 126, which requests may be received by one or more of the compute instances of the test deployment group 112.

The operations 600 further include, at block 608, storing data indicating, for each test of the set of tests, whether the test has been observed by the compute instance. For example, the compute instances 110 of the test deployment group 112 may each maintain test coverage tables 128 indicating whether each test identified in the test lists 126 has been observed by the compute instance.

The operations 600 further include, at block 610, sending one or more messages indicating whether the compute instance has observed all tests of the set of tests. For example, each of the compute instances 110 of the test deployment group 112 may periodically generate and send a test coverage status message 132 indicating whether the compute instance has observed all tests of the set of the tests (for example, by analyzing the compute instance's test coverage table 128).

Figure 7:
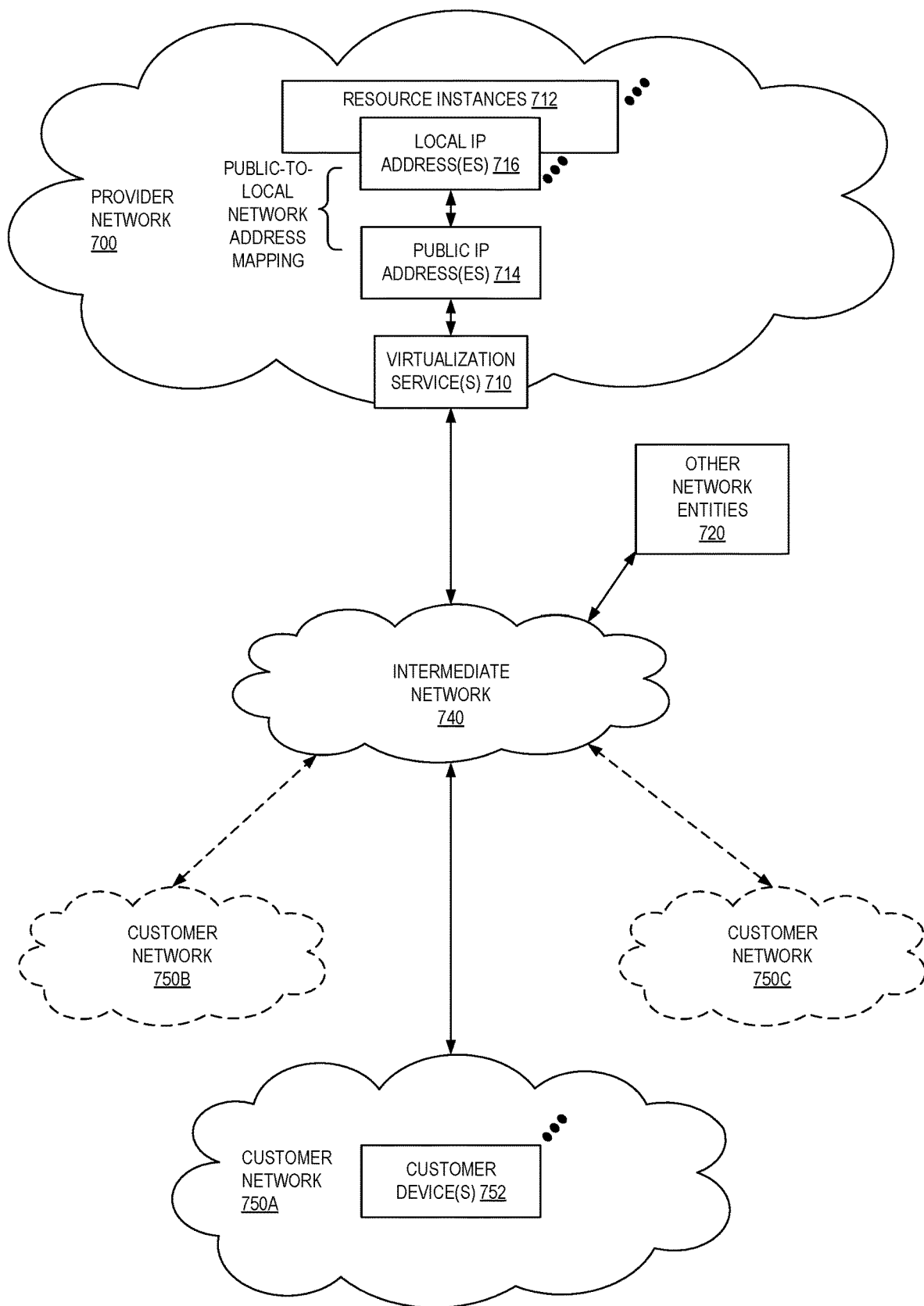
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (for example, Internet Protocol version 4 (IPv4) or Internet Protocol version 6 (IPv6) addresses) that customers may obtain from the provider 700.

Conventionally, the provider network 700, via the virtualization services 710, may allow a customer of the service provider (for example, a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
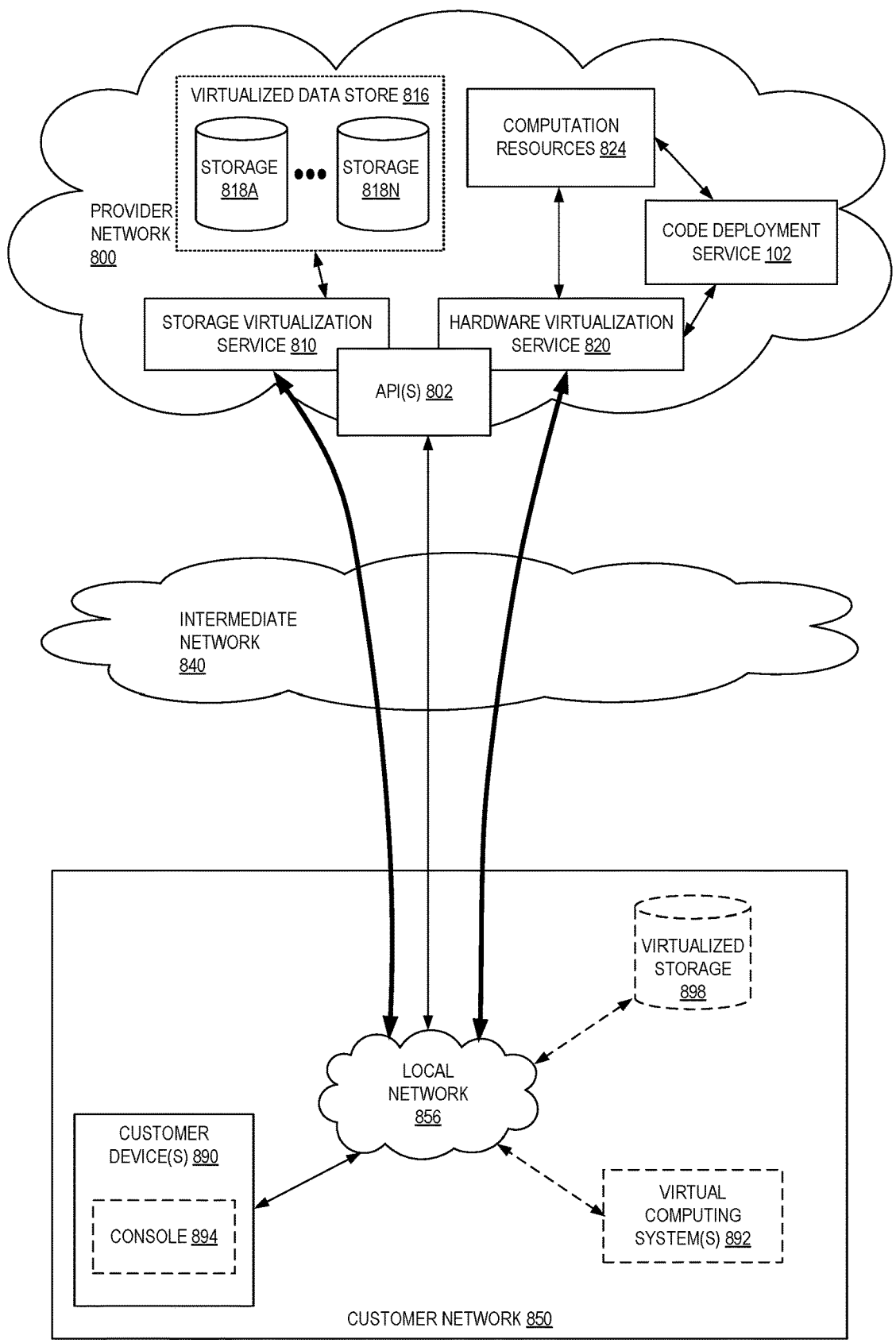
FIG. 8 is a block diagram of an example provider network that provides a storage virtualization service and a hardware virtualization service to customers according to some embodiments.

FIG. 8 is a block diagram of an example provider network that provides a storage virtualization service, a hardware virtualization service, a code deployment service (as shown in FIG. 1), and possibly any number of other services to customers, according to some embodiments. Hardware virtualization service 820 provides multiple computation resources 824 (for example, VMs) to customers. The computation resources 824 may, for example, be rented or leased to customers of the provider network 800 (for example, to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (for example, a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (for example, via console 894), the customer may access the functionality of storage virtualization service 810, for example via one or more APIs 802, to access data from and store data to storage resources 818A-818N of a virtual data store 816 provided by the provider network 800. In some embodiments, a virtualized data store gateway (not shown) may be provided at the customer network 850 that may locally cache at least some data, for example frequently accessed or critical data, and that may communicate with virtualized data store service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes, which appear to the user as local virtualized storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Figure 9:
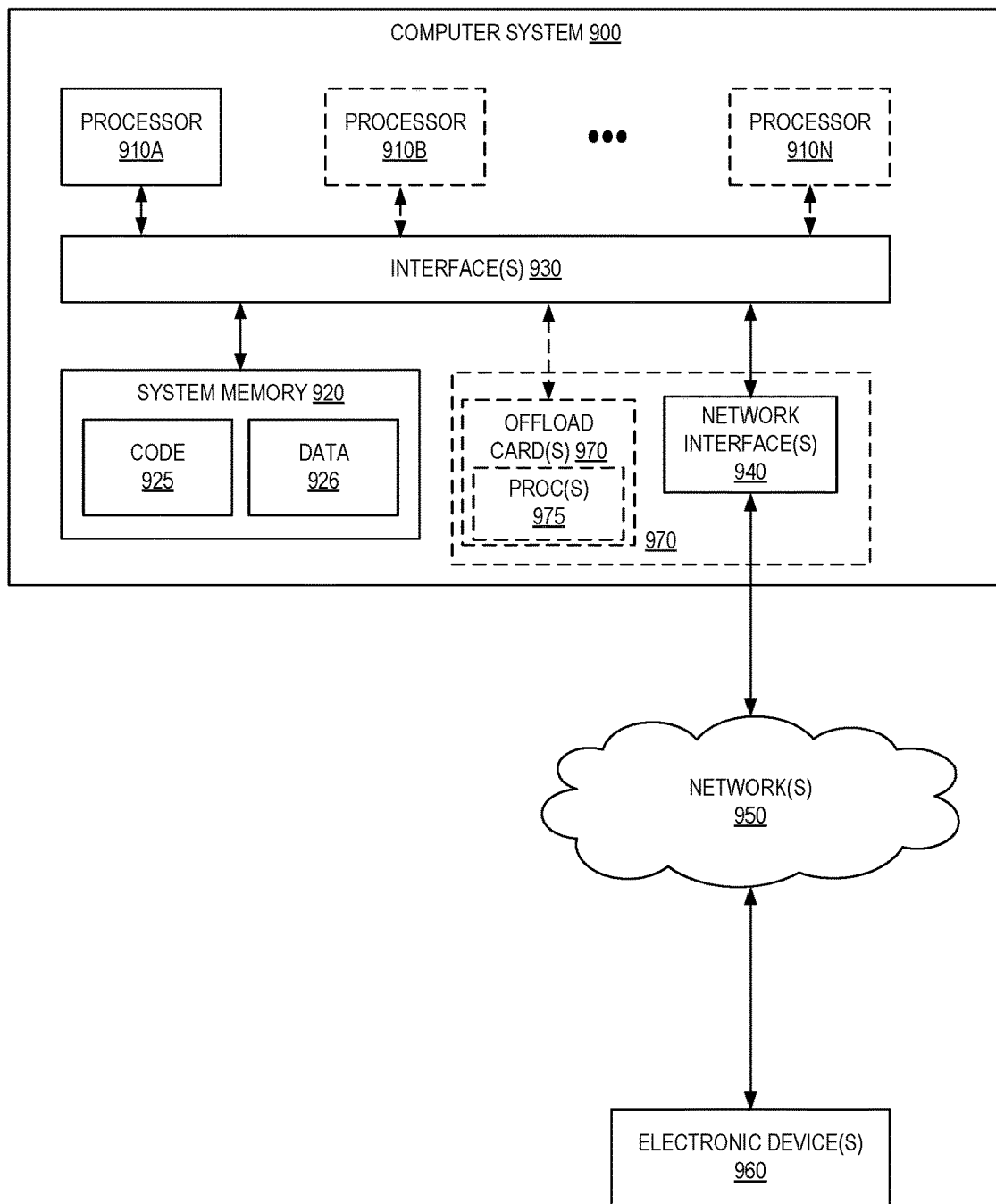
FIG. 9 is a block diagram illustrating an example computer system that may be used in some embodiments.

In some embodiments, a system that implements a portion or all of the techniques for measuring test coverage during a phased software deployment as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (for example, two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (for example, system memory 920) into a format suitable for use by another component (for example, processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (for example, a bus implementing a version of the Peripheral Component Interconnect—Express (PCI-E) standard, or another interconnect such as a QuickPath interconnect (QPI) or UltraPath interconnect (UPI)). For example, in some embodiments the computer system 900 may act as a host electronic device (for example, operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (for example, upon a request from a hypervisor) that is executed by the other processors 910A-910N of the computer system 900. However, in some embodiments the virtualization manager implemented by the offload card(s) 970 can accommodate requests from other entities (for example, from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, for example, disk or DVD/CD coupled to computer system 900 via I/O interface 930. A non-transitory computer-accessible storage medium may also include any volatile or non-volatile media such as RAM (for example, SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (for example, large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (for example, application layers 114A-114B) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (for example, A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   deploying an update to a software application to a first plurality of compute instances of a deployment group, wherein the deployment group is a defined subset of a second plurality of compute instances running the software application within a computing environment, and wherein the one or more compute instances obtain data identifying a set of tests to be performed to test operation of the software application;
   sending, by an automated testing application, a plurality of requests to the computing environment, wherein each of the plurality of requests corresponds to one or more tests of the set of tests and includes an identifier of the one or more tests to which the request corresponds, and wherein the computing environment routes each of the plurality of requests to one or more compute instances of the computing environment for processing, and wherein a first request of the plurality of requests is routed to at least a first compute instance and a second request of the plurality of requests is routed to at least a second compute instance, where the first compute instance and the second compute instance are different compute instances;
   obtaining an indication that each test of the set of tests has been observed by at least one compute instance of the deployment group, wherein at least one first test of the set of tests is determined to have been observed by the first compute instance of the deployment group and at least one second test of the set of tests is determined to have been observed by the second compute instance of the deployment group, wherein the first test and the second test are different tests, and wherein the compute instances of the deployment group obtain data identifying the set of tests, and wherein each of the of compute instances of the deployment group creates a test coverage data structure that includes a stored indication of whether each test of the set of tests has been observed;
   deploying the update to compute instances of the first plurality of compute instances running the software application;
   deploying an update to the automated testing application, the update to the automated testing application including one or more additional tests to test operation of the software application;
   and updating the data identifying the set of tests to include identifiers of the one or more additional tests.

2. The computer-implemented method of claim 1, wherein the at least one compute instance sends a plurality of test coverage status messages over time, wherein each of the test coverage status messages provides an indication of whether the at least one compute instance has observed all tests of the set of tests.

3. A computer-implemented method comprising:
   deploying an update to a software application to a plurality of first compute instances of a deployment group, wherein the deployment group is a defined subset of a plurality of second compute instances running the software application within a computing environment;
   sending a plurality of requests to the computing environment, wherein each of the plurality of requests corresponds to one or more tests of a set of tests used to test operation of the software application;
   determining that each test of the set of tests has been observed by at least one compute instance of the deployment group, wherein at least one first test of the set of tests is determined to have been observed by a first compute instance of the deployment group and at least one second test of the set of tests is determined to have been observed by a second compute instance of the deployment group, wherein the first compute instance and the second compute instance are different compute instances and wherein the first test and the second test are different tests; and
   deploying the update to compute instances of the plurality of second compute instances running the software application;
   wherein the plurality of first compute instances obtain data identifying the set of tests used to test operation of the software application, and wherein each of the plurality of first compute instances creates a test coverage data structure that includes a stored indication of whether each test of the set of tests has been observed.

4. The computer-implemented method of claim 3, wherein the plurality of first compute instances send test coverage status messages providing indications of whether the first compute instances have observed all tests of the set of tests.

5. The computer-implemented method of claim 3, wherein a compute instance of the computing environment routes the plurality of requests to one or more other compute instances of the computing environment for processing.

6. The computer-implemented method of claim 3, wherein a compute instance of the deployment group observes a test of the set of tests upon receiving a request including an identifier of the test.

7. The computer-implemented method of claim 3, wherein the at least one compute instance is one of: a physical host, a virtual machine (VM), a container, a serverless function.

8. The computer-implemented method of claim 3, wherein the at least one compute instance sends a plurality of status messages over time indicating whether the at least one compute instance has observed all tests of the set of tests.

9. The computer-implemented method of claim 3, wherein the at least one compute instance sends a status message indicating one or more of: a number of tests observed by the at least one compute instance, a percentage of tests observed by the at least one compute instance, a time at which one or more tests were observed by the at least one compute instance.

10. The computer-implemented method of claim 3, wherein the plurality of requests are sent by a software testing application, and the method further comprises:
updating the software testing application to include one or more additional tests; and
updating data identifying the set of tests to include identifiers of the one or more additional tests, the data used by the at least one compute instance to identify tests to be observed by the at least one compute instance.

11. The computer-implemented method of claim 3, wherein the computing environment includes compute instances running a plurality of different software applications including the software application.

12. The computer-implemented method of claim 3, wherein the plurality of requests include at least one of: an application programming interface (API) request, a Hypertext Transfer Protocol (HTTP) request, a File Transfer Protocol (FTP) request, a Transmission Control Protocol (TCP)-based request, a network-based request, or a command-line interface (CLI) command.

13. The computer-implemented method of claim 3, further comprising:
creating, by a code deployment service that deploys the update to the software application, a table that identifies each test of the set of tests and an indication of whether each test of the set of tests has been observed by at least one compute instance of deployment group;
receiving a status message from each of a plurality of compute instances of the deployment group indicating that the compute instance has observed a test of the set of tests; and
determining that each test of the set of tests has been observed by at least one compute instance of the deployment group by analyzing the table.

14. The computer-implemented method of claim 3, wherein deploying the update to the software application to the plurality of first compute instances includes one or more of: stopping execution of a version of the software application currently executing on the plurality of first compute instances, downloading the update to the plurality of first compute instances, creating a backup of the software application currently executing on the plurality of first compute instances, installing the update on the plurality of first compute instances, configuring the update to the software application, and starting execution of the update to the software application.

15. A system comprising:
a code deployment service implemented by one or more first processors of a first one or more electronic devices, the code deployment service including instructions that upon execution by the one or more first processors cause the code deployment service to:
deploy an update to a software application to a plurality of first compute instances of a deployment group, wherein the deployment group is a defined subset of a plurality of second compute instances running the software application within a computing environment, determine that each test of a set of tests has been observed by at least one compute instance of the deployment group, wherein at least one first test of the set of tests is determined to have been observed by a first compute instance of the deployment group and at least one second test of the set of tests is determined to have been observed by a second compute instance of the deployment group, and deploy the update to the software application to compute instances of the plurality of second compute instances running the software application; and a compute instance of the deployment group implemented by one or more second processors of a second one or more electronic devices, the compute instance including instructions that upon execution by the one or more second processors cause the compute instance to:
install the update to the software application, obtain data identifying the set of tests to be observed by the compute instance to test operation of the software application, receive a plurality of requests generated by an automated testing application, each of the plurality of requests corresponding to one test of the set of tests and including an identifier of the one test to which the request corresponds, store data indicating each test of the set of tests that has been observed by the compute instance, and send one or more messages indicating whether the compute instance has observed all tests of the set of tests.

16. The system of claim 15, wherein the computing environment routes requests received from the automated testing application to one or more compute instances of the computing environment for processing.

17. The system of claim 15, wherein the data indicating each test of the set of tests that has been observed by the at least one compute instance is stored in a table created by the at least one compute instance based on the data identifying the set of tests to be observed by the at least one compute instance.

18. The system of claim 15, wherein the at least one compute instance is one of: a physical host, a virtual machine (VM), a container, a serverless function.

19. The system of claim 15, wherein the at least one compute instance sends a plurality of messages over time indicating whether the at least one compute instance has observed all tests of the set of tests.

\* \* \* \* \*